United States Patent Office 3,528,714
Patented Sept. 15, 1970

3,528,714
BEARING AND METHOD BEARING CONSTRUCTION
Albert R. McCloskey, Fairfield, Conn., assignor to The Heim Universal Corporation, Fairfield, Conn., a corporation of Delaware
Application Feb. 23, 1967, Ser. No. 617,952, now Patent No. 3,471,207, which is a continuation-in-part of application Ser. No. 566,799, July 21, 1966. Divided and this application Jan. 30, 1969, Ser. No. 810,070
Int. Cl. F16c 33/00
U.S. Cl. 308—238   4 Claims

ABSTRACT OF THE DISCLOSURE

A bearing advantageously includes a self-lubricating liner comprising a mixture of adhesive resin and powdered or flocked polytetrafluoroethylene particles, or a woven polytetrafluoroethylene fabric embedded in such resin. The liner is cured under conditions of high pressure and high temperature.

---

Figure 1:
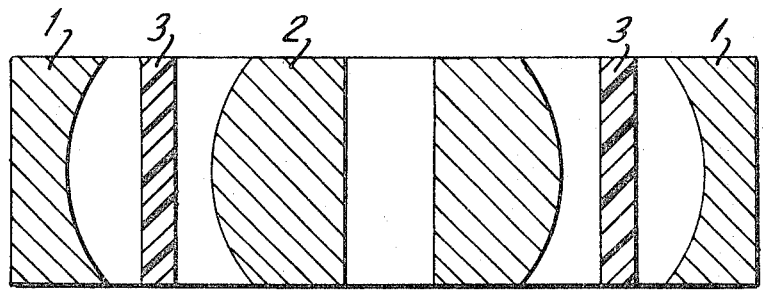

The present invention relates to a method of constructing self-aligning bearings and bushings (all of which are hereinafter referred to as "bearings"), and to the products produced thereby. This application is a division of my copending application Ser. No. 617,952 filed Feb. 23, 1967 now Pat. No. 3,471,207 which, in turn, is a continuation-in-part of my like entitled application Ser. No. 566,799, filed July 21, 1966, now abandoned.

Traditionally, bearings have been lubricated by liquid lubricants such as oil. It has been necessary to design such bearings carefully so that they would retain oil for some time. Even with the best design, however, it has been necessary to periodically replenish the oil supply. If the oil was not replenished, either because the bearings were in out-of-the-way locations or because they were not properly maintained, the bearings became dry and wore rapidly.

Many efforts have been made to produce bearings using dry lubricants such as various types of plastic, graphite, or special chemicals. Generally speaking, these dry lubricants are soft and consequently are easily distorted under heavy loads. In particular, either the dry lubricant was squeezed out of the bearings or else the bearings became loose and wore rapidly. In addition, it is characteristically difficult to bond such dry lubricants to a desired bearing member.

It is therefore an object of the present invention to provide bearings having a liner which includes a dry self-lubricating material for providing a low sliding friction surface, and which is wear resistant under heavy and constant loads.

It is a further object of the present invention to provide a method for fabricating bearings of the type described herein.

In accordance with one aspect of the present invention, a bearing liner is adapted to include a flocked or powdered self-lubricating plastic material, such as Teflon (a trademark of the Du Pont Corporation for polytetrafluoroethylene), adhered to a backing material.

The liner is produced by depositing an epoxy-base adhesive resin and Teflon particle mixture on the backing material. When the resin has set, the liner is cured by simultaneously applying heat and pressure thereto. The resulting calendared composition exhibits self-lubricating and load supporting properties, and is sufficiently flexible to be formed into cylindrical bearing liner shape.

In accordance with another aspect of the present invention, the liner is produced by forcing an adhesive into the interstices of a self-lubricating plastic woven material under great pressure and simultaneously applying heat so that the adhesive cures. The pressure is sufficient to flatten the threads and flatten the weave of the cloth; and the adhesive, which is cured at the same time, holds the threads and the weave in the flattened condition. The resulting fabric, however, is still sufficiently flexible to be formed into a liner.

Figure 2:
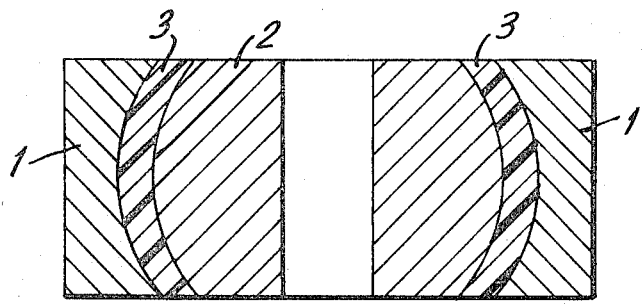
Figure 3:
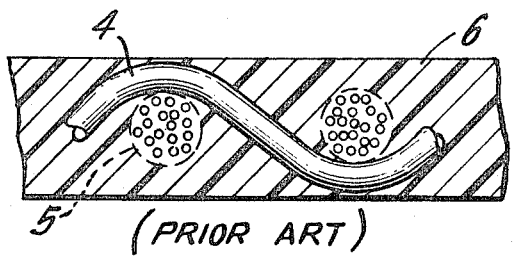
Figure 4:
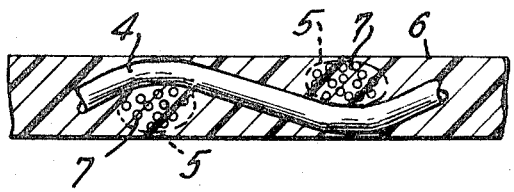
Figure 5:
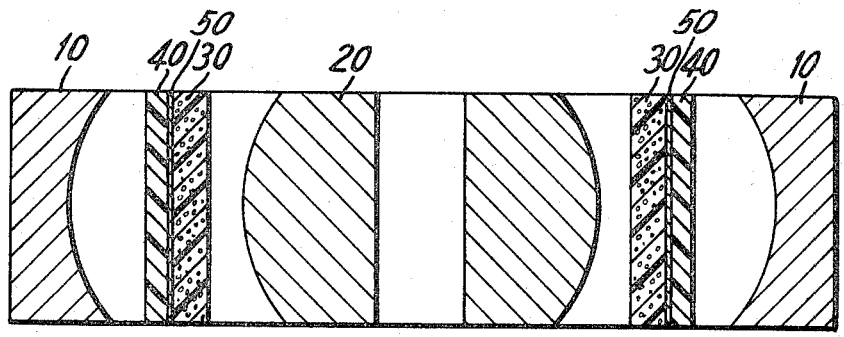
Figure 6:
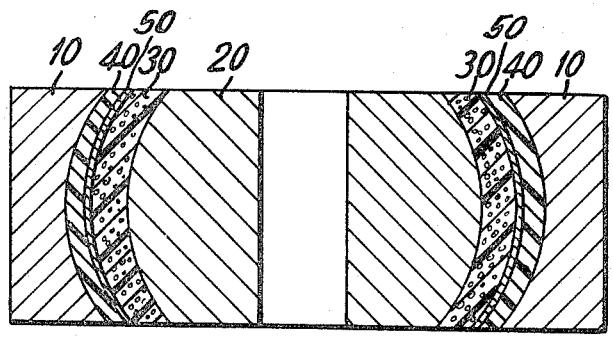

The above and other objects and features of the present invention will be apparent from the following detailed description of illustrative embodiments thereof presented hereinbelow in conjunction with the accompanying drawing, in which:

FIG. 1 shows one of the type of bearing produced by the present invention prior to assembly;
FIG. 2 shows the bearing of FIG. 1 after assembly;
FIG. 3 is a cross-section view of the adhesive impregnated woven cloth used in the prior art;
FIG. 4 is a cross-section view of the adhesive impregnated cloth made in accordance with the present invention;
FIG. 5 illustrates another of the type of bearings produced by the present invention prior to assembly;
FIG. 6 shows the bearing of FIG. 5 after assembly; and
FIGS. 7 and 8 comprise truncated cross-sectional views of two alternative bearing liner compositions employed in the bearing of FIG. 5.

A first illustrative bearing liner made in accordance with the principles of the present invention employs a mixture of thermosetting resin and particles of a self-lubricating, heat resistant plastic material, preferably Teflon (polytetrafluoroethylene). In one advantageous form of the invention, a mixture of approximately equal amounts of Resiweld R–7119 epoxy-base resin manufactured by the H. B. Fuller Company, St. Paul, Minnesota and Teflon powder is employed. The Teflon powder may be purchased, or prepared by rolling commercial sheet polytetrafluoroethylene and abrading the material with a file while it is rotating at a high rate of speed in a lathe. As an alternative to the powder, Teflon flocking comprising strands of polytetrafluoroethylene fiber, typically about 1/64 of an inch long, may be utilized. Such Teflon particles may be chemically etched to render them more bondable.

The Teflon powder-epoxy resin mixture is deposited by panting, spraying or the like on a backing material. The backing material may comprise, for example, a woven fabric having threads of Dacron (a trademark of the Du Pont Corporation for a polyester staple length fiber), fiberglass, aluminum foil, or the like. For additional lubricity, an additional layer of Teflon particles (powder or flock) may be deposited on the liner face most remote from the backer at this stage in liner processing.

Moreover, this liner face may also be dusted for this purpose with a suitable solid lubricant such as molybdenum disulfide. In addition to its lubricating properties, this composition further reduces bearing friction by coating the resin and leveling the valleys present at the interface between the bearing linear and inner member. However, it is not necessary to use molybdenum disulfide or other dry lubricants since the Teflon itself has excellent lubricating properties. The resin composition is allowed to stand on the backer material until set, typically about one day.

The composite liner is then placed between flat platens of a high pressure press. The press platens, heated for the above-specified Resiweld adhesive to a temperature in the range of 350–400 degrees Fahrenheit (advantageously about 375° F.), exert a pressure in the range of 400–1000 pounds per square inch (advantageously about 600 p.s.i.). The foregoing conditions obtain for about one-half hour except for a short reduction in the applied pressure for gas relief.

In order to increase production, a sandwich may be made starting with stainless steel, a slip sheet of pure Teflon, an uncured composite liner, another layer of pure Teflon, another uncured liner, and so forth, terminating in a final layer of stainless steel. The slip sheets of pure Teflon are used to avoid the sticking of the resin to the rigid steel members. It is observed, however, that the thickness of the sandwich is limited so that the adhesive line of every sheet attains the requisite curing temperature. To this end, and also for mechanical rigidity, additional intermediate layers of stainless steel, having Teflon slip sheets on either side thereof, may be employed.

The foregoing operation causes the Resiweld resin to cure, i.e., to irreversibly harden by polymerizing, thereby locking the polytetrafluoroethylene particles in place affixed to the backing material. After the curing cycle, the calendared liner is removed from the press, and is flexible in the sense that it may be readily bent into tubular form.

Another layer of uncured resin is next applied to the liner material, and more particularly to the liner backer. The second coat of resin is allowed to set, e.g., to harden for about one day. The resin is preferably the same epoxy-base resin used previously, although other adhesives may be employed. Such alternative adhesives may be purchased in film form.

As shown in cross-sectional form in FIG. 5, the liner material 30 with its uncured second coat of resin 40 and backer 50 is formed into a tube and placed between an outer ductile metal member 10 and an inner member 20 of a spherical bearing, the members 10 and 20 being respectively initially characterized by preformed concave and convex mating surfaces. The bearing is then contracted under pressure, for example by forcing a tapered die over the outer member to form the assembled bearing shown in FIG. 6.

Since the Teflon particles are locked in the cured resin which adheres to the backer, the liner does not exhibit the "spring" which characterizes prior art woven fabric liners. Accordingly, after contraction, the liner made according to the present invention is not deformed by heavy applied loads. Thus, close and uniform tolerances are maintained between the inner and outer bearing members.

Subsequent to assembly and contraction, the bearing is placed in an oven where it is heated to a temperature somewhat less than that employed in the first curing cycle, i.e., to about 350° for the Resiweld adhesive. Its somewhat lower temperature is sufficient to cure the second coat of resin and bond the composite liner 30 to the outer member 10. Moreover, since the temperature is lower than that which obtained during the first curing operation, the lubricating surfaces of the liner facing the inner member 20 does not soften during this latter heating process. Accordingly, there is no undesired adhesion between the liner 30 and the inner member 20. If desired, the liner 30 may be placed with the resin backing against the inner member 20 so that it adheres thereto.

Figure 7:
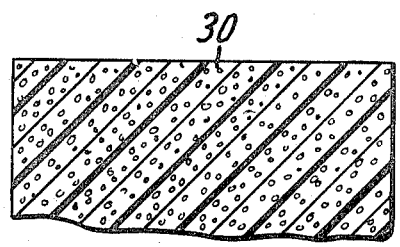
Figure 8:
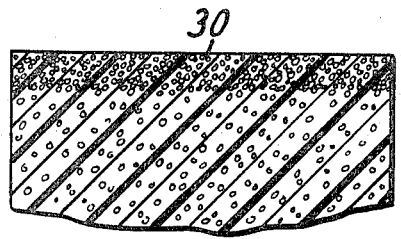

FIGS. 7 and 8 are employed to respectively illustrate in cross-sectional form, bearing liners 30 which respectively do, and do not include the optional additional tetrafluoroethylene particles at the self-lubricating (upper) surface thereof.

In accordance with another aspect of the present invention, a bearing liner is advantageously fabricated from cloth woven of Teflon threads. Such cloth may comprise a single woven embodiment, or a compound, double woven material including threads of Teflon interwoven with threads of a more readily adherent material, such as cotton or Dacron. Cloth of this latter type is manufactured by the Russell Manufacturing Company.

An uncured thermosetting resin, e.g., the aforementioned Resiweld R–7119 epoxy, is applied to one surface of the cloth material. The resin may be applied by painting, spraying, calendaring and the like. Here also, the side opposite the resin coating may be dusted with a suitable solid lubricant such as molybdenum disulfide.

The woven cloth, with its resin coat on one side, is placed between flat platens of a high pressure press. The press platens are heated under high pressure, with the platens remaining closed until the resin is cured. The requisite temperature is comparable with that given above regarding the Teflon particle liner when the like Resiweld adhesive is used, while the necessary pressure varies around 1500 p.s.i. depending upon the weave of the Teflon cloth. To increase production the above-described "sandwich" technique of employing alternate layers of uncured liners and Teflon slip sheets between stainless steel outer elements may be employed.

After the curing cycle, the impregnated cloth is removed from the press. The cloth at this point in the process is flexible in the sense that it may be readily bent into a tubular form. It is however, not as flexible as the pure cloth. When the cloth is bent, it does not crack and the cured adhesive does not separate from the cloth.

Another layer of uncured resin is then applied to the compressed cloth. If a double woven cloth is used, the second coat is applied to the side showing the adhesive threads. This second coat of resin is likewise painted onto the cloth, although other methods may be used for applying the resin.

As shown in FIG. 1, the compressed cloth with its second coat of uncured resin 3 is then formed into a tube and placed between the outer ductile metal member 1 and the inner member 2 of a spherical bearing, the members 1 and 2 being respectively initially characterized by preformed concave and convex mating surfaces. The bearing is then contracted under pressure to form the assembled bearing shown in FIG. 2.

Since the fibers of the compressed liner cloth are locked in the cured resin, the cloth does not exhibit the "spring" which characterizes woven fabrics. Accordingly, after contraction, the liner made according to the present invention is not deformed by heavy applied loads. Thus close and uniform tolerances are maintained between the inner and outer bearing members.

Subsequent to contraction and assembly, the bearing is placed in an oven where it is heated. This heating cures the second coat of resin and bonds the Teflon cloth 3 to the outer member 1. If desired, the cloth may be placed with the resin backing against the inner member 2 so that it adheres to the inner member.

FIG. 3 is a drawing of a Teflon fabric which has been caused to adhere to a metal backing member by conventional methods. This figure shows the dispersion of resin adhesive 6 in a lubricating fabric made by such methods. Conventional methods do not use the high pressures employed in the present invention. Consequently, in conventional methods, the adhesive 6 flows only between the interstices of the warp 4 and the woof 5 of the cloth. The adhesive 6 also forms a layer on the back side of the cloth.

In contrast, as shown in FIG. 4, the great pressures used in the present invention force the adhesive 6 not only between the warp and woof of the cloth but also between the filaments 7 making up each of the threads of the cloth. The adhesive 6 in the present invention bonds the filaments one to another as well as bonds the threads together so that when the threads are flattened by the press the adhesive holds the threads in their flattened shape. As in conventional methods an adhesive film is also formed on the back side of the cloth. The adhesive in the present invention adheres to the metal member 1 of FIG. 1 and physically surrounds and entraps a substantial number of the filaments of the threads of the cloth. This provides a far superior mechanical bond than was possible previously.

Although the above illustrative embodiments of my invention have been directed to the construction of spherical bearing members, the same process may be used to produce a bushing or other bearing member. In such case, the outer member 1 or 10 and the inner member 2 or 20 have straight mating walls.

It is to be understood that the above-described method and arrangements are only illustrative of the application of the principles of the present invention. Numerous other methods and arrangements may be devised by those skilled in the art without departing from the spirit and scope of the invention. For example, a liner may be fabricated by depositing pure adhesive on a backing material, and then depositing Teflon particles on the self-lubricating liner surface. Also, the Teflon particles and cloth discussed above may be fabricated from carbon filled polytetrafluoroethylene available from the Garlock Packing Co. Further, in the case of the woven liner, the epoxy-base resin may be applied on both sides of the basic liner fabric between the heated platens to provide greater penetration of the resin into the interstices of the fabric.

What is claimed is:

1. A bearing comprising an outer metal member, an intermediate fabric member and an inner metal member, said bearing fabric member comprising interwoven self-lubricating plastic threads each including a plurality of self-lubricating plastic filaments, said threads being flattened, and a cured adhesive resin adhering to one of the said metal members and surrounding and locking in place the filaments of said threads, said resin thereby maintaining the threads in their flattened condition.

2. A combination as in claim 1 further comprising a solid lubricant disposed between said inner member and said intermediate fabric.

3. A combination as in claim 2 wherein said solid lubricant comprises molybdenum disulfide.

4. A bearing surface comprising a base, a layer of interwoven self-lubricating plastic threads, said threads consisting of self-lubricating plastic filaments, said threads being flattened, and a cured adhesive plastic resin surrounding and locking said filaments and adhered to said base.

References Cited
UNITED STATES PATENTS

| | | | |
|---|---|---|---|
| 2,029,366 | 4/1936 | Geyer | 308—238 X |
| 2,723,932 | 11/1955 | Ross | 161—77 |
| 3,055,788 | 9/1962 | Stanhope | 308—238 X |
| 3,151,015 | 9/1964 | Griffith | 308—238 X |
| 3,250,554 | 5/1966 | Roude | 308—238 X |
| 3,251,724 | 5/1966 | Spokes | 308—238 |
| 3,266,123 | 8/1966 | McCloskey | 308—238 X |

WESLEY S. RATLIFF, JR., Primary Examiner